Patented Oct. 12, 1943

2,331,544

UNITED STATES PATENT OFFICE 2,331,544

UNDERCOAT COMPOSITION AND METHOD OF MAKING SAME

Loy S. Engle, Harrington Park, N. J., assignor to Interchemical Corporation, New York, N. Y., a corporation of Ohio No Drawing. Application July 2, 1940, Serial No. 343,555

8 Claims. (Cl. 260—40)

This invention relates to an undercoat composition for application to metal under a finishing enamel and to a method of making the composition.

A principal object of the invention is to provide on metal a strongly adherent coating which, besides protecting the metal from rusting and furnishing a smooth, dull surface appropriate for the application of a finishing enamel, is ductile so that it is not injured by the stretching of the surface of the metal to which it is applied.

A special object of the invention is to provide a coating for the steel plates used in making automobile body parts which can withstand, without injury, the severe die-forming operations by which such parts are shaped.

A coating composition embodying my invention has a flexible binder adherent to metal and contains rust-inhibitive, covering and filling pigment in the condition of the pigment of an enamel, that is, in the fine, deflocculated, fully-wetted condition required to produce a gloss surface. The volume ratio of pigment to binder is high enough to produce a dull finish in spite of the enamel condition of the pigment, and low enough to permit the encasing of each particle of pigment by the binder. The dull finish of the coating permits good adherence of a finishing enamel applied over it. The enamel condition of the pigment in the flexible binder makes the coating ductile, so that it is not injured by the surface stretching and contraction which occurs in die-forming heavy metal.

To clarify further the nature of my invention, I will give specific examples of coating compositions embodying it:

Example I

A paste is made by mixing the following ingredients:

| | Parts by weight |
|---|---|
| Venetian red | 60.0 |
| Zinc chromate (pH value 6.5) | 6.7 |
| 50% solution of oil-modified alkyd resin in hi-flash naphtha | 23.3 |
| Hi-flash naphtha | 10.0 |
| | 100.0 |

This paste is ground, preferably in a steel ball mill, until the pigment is fully deflocculated and wetted. A minimum of 36 hours of such grinding is required, according to my experience, to put the pigment into enamel condition. The paste is then thinned by additional solvent and additional binder to the following composition:

| Pigment (deflocculated): | Parts by weight |
|---|---|
| Venetian red | 34.0 |
| Zinc chromate | 3.8 |
| Binder: | |
| Oil-modified alkyd resin | 22.5 |
| Solvents: | |
| Hi-flash naphtha | 36.7 |
| Terpene "B" hydrocarbon | 3.0 |
| | 100.0 |

Volume ratio, pigment to binder—2:3 approximately

The composition is used by applying it to metal, most desirably by means of a roll-coating machine, and then setting it by baking at about 400° F. for about 12 minutes.

The oil-modified alkyd resin specified in the above formula is made by reacting 126 parts of glycerol, 195 parts of phthalic anhydride, 85 parts of soya bean oil acid, 47 parts of dehydrated castor oil acids, 27 parts of soya bean oil and 27 parts of dehydrated castor oil in conventional manner to form a low-acid resin, reducing to 50% non-volatile with hi-flash naphtha, when an acid number of 5 to 10 is attained.

The hi-flash naphtha specified in the above formula is a coal tar distillate having a boiling range of about 150° C.–200° C.

The terpene "B" hydrocarbon specified in the above formula is a pine oil derivative produced as a by-product in the manufacture of synthetic camphor, whose approximate composition is terpinene 25.4%, terpinolene 63.4% and di-pentine 11.2%.

Example II

| Pigment (deflocculated): | Parts by weight |
|---|---|
| Titanium dioxide | 40.7 |
| Zinc chromate | 4.1 |
| Carbon black | 0.3 |
| Binder: | |
| Oil-modified alkyd resin | 20.7 |
| Solvents: | |
| Hi-flash naphtha | 30.7 |
| Terpene "B" hydrocarbon | 3.5 |
| | 100.0 |

Volume ratio, pigment to binder—3:5

This composition is made and used in the same manner as that of Example I.

Example III

| Pigment (deflocculated): | Parts by weight |
|---|---|
| Venetian red | 38.4 |
| Zinc chromate | 4.3 |
| Binder and solvents: | |
| China-wood oil rosin varnish | 16.4 |
| Congo perilla varnish | 27.6 |
| China-wood oil Congo rosin varnish | 6.9 |
| Oil varnish | 6.4 |
| | 100.0 |

Volume ratio, pigment to binder—2:5 approximately

This coating composition is made and used in the same manner as that of Example I.

The China-wood rosin varnish specified in the above formula is made by heating 50 gallons of China-wood oil to 475° F. to a string, adding 100 pounds of rosin, and reducing to 58% non-volatile with a petroleum fraction of a boiling range of about 150° C.–200° C.

The Congo perilla varnish specified is made by fusing 100 pounds of Congo resin, adding perilla oil at 500° F., bodying and reducing to 63% non-volatile with a petroleum fraction of a boiling range of about 150° C.–200° C.

The wood oil Congo rosin varnish specified is made by fusing 50 pounds of Congo and 50 pounds of rosin, adding the mixture to 10 gallons of wood oil bodied to a string at 475° F., and reducing to 46% non-volatile with a petroleum fraction of a boiling range of about 150° C.–200° C.

The oil varnish specified is made by bodying a mixture of 100 parts of perilla oil and 100 parts of linseed oil at 610° F. for 2½ hours, adding 100 parts of China-wood oil, heating to 575° F. for 15 minutes, and reducing to 78% non-volatile with a petroleum fraction of a boiling range of about 150° C.–200° C.

The binders specified in the above examples are flexible resinous binders which are metal-adherent, that is, they have such affinity for metal as to adhere well to it. They may be replaced by other flexible binders known to be metal-adherent, such for example as chlorinated rubber plasticized with liquid chlorinated di-phenyl resin. I find it more desirable, however, to use oleo-resinous binders such as those specified in the examples. Oil-modified alkyd resins, such as that specified in Example I, have proved particularly satisfactory. When such resins are used, their oil content should be between 30% and 60%.

The zinc chromate is a rust-inhibitive pigment. I have found it the most satisfactory of known rust-inhibitive pigments, but it may be replaced by other pigments of this class, such, as for example, the commercial grade of red lead known as "orange mineral."

The Venetian red is a natural iron ore pigment containing approximately 25% of iron oxides and 75% of mineral filling pigments. It may be replaced with other iron-oxide-bearing pigments such as burnt umber or burnt sienna, or by other filling or covering pigment which may be deflocculated and fully wetted by the binder. I prefer, however, to use pigments containing oxides of iron, as they have rust-inhibiting properties and are susceptible of complete deflocculation.

The volume ratios of pigment to binder in the above examples are high enough to produce a dull finish in spite of the enamel condition of the pigment, and low enough to permit the encasing of each particle of the pigment by the flexible binder, so that a dull, ductile coating is produced. Although the proportion of pigment is higher than that normally used in roller coating formulations, its enamel condition permits the application of a smooth coating of the composition by a roller-coating machine. As shown by the examples, some variation in the ratio of pigment to binder may be made without losing these important characteristics of the coating, but the ratio should, in general, be between 1:1 and 1:3. This high pigmentation, besides securing a dull surface, without flocculation or the use of flatting agent, has the advantage of giving the coating the body required to fill and smooth over scratches in the metal surface to which the composition is applied, so as to provide the smooth surface suitable for the application of a finishing enamel.

If the coating composition made in accordance with the above formula be modified by reducing the volume ratio of pigment to binder to a ratio of 1:9, common in enamels, without making any other change in the composition, a coating with a gloss surface will result, showing that the composition contains its pigment in enamel condition.

What I claim is:

1. An undercoat composition which dries to a dull surface consisting of solvents, an oil-modified alkyd resin having an oil content between 30% and 60%, and pigment approximately equal in volume to the volume of the resin, the pigment being in the fine, deflocculated, fully-wetted condition of the pigment of an enamel.

2. An undercoat composition consisting of solvents, a flexible, metal-adherent binder, and zinc chromate and iron-oxide-containing pigments in the fine, deflocculated, fully-wetted condition of the pigment of an enamel, the volume ratio of pigment to binder being large enough to give a dull surface and small enough to permit the binder to incorporate and completely surround each pigment particle.

3. The method of making an undercoat composition which dries to a dull surface, which comprises mixing rust-inhibiting, covering and filling pigment with a flexible binder and sufficient solvent to form a paste in which the volume ratio of pigment to binder is between 1:1 and 1:3, grinding the paste until the pigment is in the fine, deflocculated, fully-wetted condition of the pigment of an enamel, and thinning the ground paste.

4. The method of making an undercoat composition which dries to a dull surface, which comprises mixing rust-inhibiting, covering and filling pigment with a flexible binder and sufficient solvent to form a paste in which the volume ratio of pigment to binder is between 1:1 and 1:3, grinding the paste in a steel ball mill for not less than 36 hours, and thinning the ground paste.

5. An undercoat composition which dries to a dull surface consisting of solvents, an oil-modified alkyd resin having an oil content between 30% and 60%, and pigment approximately equal in volume to the volume of the resin, said pigment comprising essentially zinc chromate and Venetian red in the fine, deflocculated, fully-wetted condition of the pigment of an enamel.

6. An undercoat composition consisting of solvents, a flexible, metal-adherent binder, and pigments in the fine, deflocculated, fully-wetted condition of the pigment of an enamel, the volume ratio of pigment to binder being large enough to give a dull surface and small enough to permit the binder to incorporate and completely surround each pigment particle.

7. An undercoat composition consisting of solvents, a flexible, metal-adherent binder, and rust-inhibiting, covering and filling pigments in the fine, deflocculated, fully-wetted condition of the pigment of an enamel, the volume ratio of pigment to binder being large enough to give a dull surface and small enough to permit the binder to incorporate and completely surround each pigment particle.

8. An undercoat composition consisting of solvents, a flexible, metal-adherent binder, and rust-inhibiting, covering and filling pigments in the fine, deflocculated, fully-wetted condition of the pigment of an enamel, the volume ratio of pigment to binder being between 1:1 and 1:3.

LOY S. ENGLE.